United States Patent
Hanika

(10) Patent No.: US 12,517,890 B2
(45) Date of Patent: *Jan. 6, 2026

(54) ROLLBACK-FREE REFERENTIAL INTEGRITY UPDATE PROCESSING

(71) Applicant: NCR Voyix Corporation, Atlanta, GA (US)

(72) Inventor: Jirí Hanika, Prague (CZ)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,012

(22) Filed: Jul. 29, 2024

(65) Prior Publication Data

US 2025/0028706 A1    Jan. 23, 2025

Related U.S. Application Data

(63) Continuation of application No. 16/914,946, filed on Jun. 29, 2020, now Pat. No. 12,050,586.

(51) Int. Cl.
  *G06F 16/00* (2019.01)
  *G06F 9/54* (2006.01)
  (Continued)

(52) U.S. Cl.
  CPC .......... *G06F 16/2365* (2019.01); *G06F 9/546* (2013.01); *G06F 11/3034* (2013.01);
  (Continued)

(58) Field of Classification Search
  CPC .. G06F 16/2365; G06F 9/546; G06F 11/3034; G06F 11/328; G06F 16/211;
  (Continued)

(56) References Cited

U.S. PATENT DOCUMENTS

| 2009/0172047 A1* | 7/2009 | Boyko | G06F 16/254 |
| 2011/0055147 A1* | 3/2011 | Joerg | G06F 9/4843 |
| | | | 707/602 |
| 2011/0313969 A1* | 12/2011 | Ramu | G06F 16/254 |
| | | | 707/602 |

FOREIGN PATENT DOCUMENTS

WO    WO-9952047 A1 * 10/1999 .......... G06F 17/303

OTHER PUBLICATIONS

Zhang et al. On Multi-col. Foreign Key Discovery. 2010, Proceeding of the VLDB Endowment; pp. 805-814.*

* cited by examiner

*Primary Examiner* — Dinku W Gebresenbet
(74) *Attorney, Agent, or Firm* — Schwegman Lundberg & Woessner, P.A.

(57) ABSTRACT

An import job associated with a data store update is inspected and schemas associated with target data tables that are to be updated with update data are analyzed. Referential integrity issues associated with foreign keys in the target tables are identified in the update data. The update data is broken into three portions, a first portion that is guaranteed to not have a referential integrity issue, a second portion this is known to have a referential integrity issue, and a third portion that cannot be determined at this stage of processing. The import job is modified to update the corresponding target tables with the first portion of the update data while the second and third portions are not updated to the target data base tables but a custom message is recorded in fields associated with the second and third portions that describes the issue for subsequent review/resolution.

18 Claims, 3 Drawing Sheets

(51) Int. Cl.
*G06F 11/30* (2006.01)
*G06F 11/32* (2006.01)
*G06F 16/21* (2019.01)
*G06F 16/23* (2019.01)
*G06F 16/25* (2019.01)

(52) U.S. Cl.
CPC .......... *G06F 11/328* (2013.01); *G06F 16/211* (2019.01); *G06F 16/254* (2019.01)

(58) Field of Classification Search
CPC ............... G06F 16/254; G06F 2201/80; G06F 11/1469; G06F 21/64
See application file for complete search history.

ROLLBACK-FREE REFERENTIAL INTEGRITY UPDATE PROCESSING

CROSS-REFERENCE TO RELATED APPLICATION

This application is a continuation of U.S. patent application Ser. No. 16/914,946, filed Jun. 29, 2020, which application and publication is incorporated herein by reference in its entirety.

BACKGROUND

Enterprises rely on data collected, data analyzed, and data processed. The data becomes the lifeblood of the enterprise and drives expense and investment decisions of the enterprise. The data is often organized and housed in databases and failover/backup systems are put in place to ensure that the data is always available. A significant amount of human resources and capital are invested by the enterprises in their data and their data warehouses.

When the data systems are updated with bad data, then business decisions can be adversely impacted or access to the data can be temporarily lost. Unfortunately, data updated to the data systems can be voluminous and can contain problems that may not be compatible with the enterprise's existing data systems.

For example, an updated data record to one database table may include a reference or a link to a different data attribute associated with a different database record in another database table. When the reference is broken (non-existent, in violation of a nullability constraint, or points to something that does not exist), the updated data record is said to have a referential integrity problem. Normally, an enterprise will forbid by policy data to update when a referential integrity issue is associated with an update. However, the referential integrity issue may not be detectable until the update is processed; as a result, enterprise policy may roll back an entire update to restore the database to its state prior to the update when a single referential integrity issue is detected during a failed update attempt.

Some enterprises may still allow the update to process even with potential referential integrity issues. This scenario creates an even bigger problem for the enterprise because the database becomes unreliable and may either cause production jobs to unexpectedly fail or worse cause production jobs to run successfully but produce results that are wrong.

SUMMARY

In various embodiments, methods and a system for processing referential integrity update processing, according to embodiments.

According to an embodiment, a method for referential integrity update processing is presented. For example, an Extract-Transform-Load (ETL) job is received to update data to data tables of a data store. Schemas for the data tables are obtained from the data store. Referential integrity issues between the update data and the data tables are derived from the schemas. The ETL job is modified to update a first portion of the update data to the corresponding data tables, the first portion lacks any of the referential integrity issues with the data tables. A modified ETL job is submitted to the data store based on modifying the ETL job.

DETAILED DESCRIPTION

Figure 1:
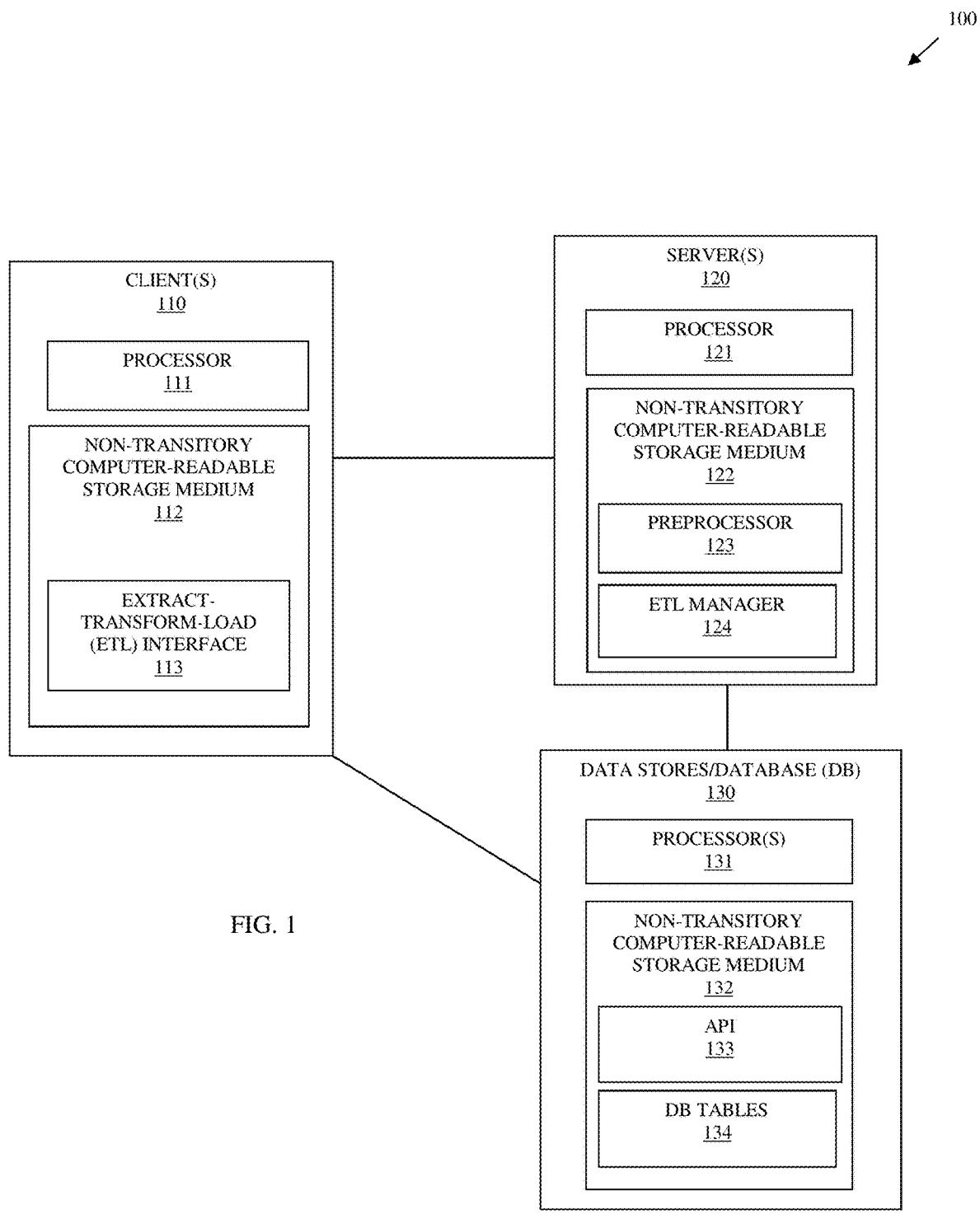
FIG. 1 is a diagram of a system for referential integrity update processing, according to an example embodiment.

FIG. 1 is a diagram of a system 100 for referential integrity update processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of referential integrity update processing, presented herein and below.

Referential Integrity is a database (DB) property of data that states all references in the DB tables are valid. This requires that if a value of an attribute references another attribute (either within the same DB table or within an external DB table), then that reference between the attributes must exist. The problem is that when enterprises attempt to update a DB with a significant volume of changes; often referential integrity is missing in some of the update data. When this occurs, the underlying DB backs out the entire update, even though a vast majority of the update data may have been valid with proper referential integrity maintained. To avoid this, developers often develop customized code that is specific to the update data and the DB tables that are being updated. This creates a lot of customized code that needs to be maintained and is problematic. Some databases permit referential integrity violations to update to the DB, this scenario is even worse than rolling back or backing out an entire update associated with referential integrity issues because the DB and the data of the DB becomes unreliable, which means production jobs may fail or even worse the production jobs do not fail but the returned data from the DB is incorrect (these situations may take a long time to find and resolve and can impact other operations that relies on the bad data).

System 100 solves this problem by through a preprocessor that utilizes the update data in combination with the schemas of the targeted database tables to automatically deduce referential integrity issues in the updated and cause portions of the update data that may or are known to violate referential integrity of the targeted database tables to not update to the corresponding DB tables of the database while simultaneously allowing a known good portion of the updated data to be extracted, transformed as needed for the update, and loaded (updated) into the appropriate targeted database tables. The removed portions are classified into two categories, an unsure category indicating that this update data is unsure as to whether it will cause update issues during the update and a known problematic category that is known to cause update issues (referential integrity violations) during the update. The two categories of data that were not updated from the update data are then provided to analysts or developers for resolution while the known good portion of the update data is updated to the corresponding target DB tables. This removes a need for customized code and ensures that updates proceed even when there are some referential integrity violations present in the update data. The unsure category exists because part of the original submitted ETL job may include portions that when processed by the data store 130 produces references that may point to a referent that does not exist, there is no way to tell this while the portion of the ETL job being processed does not yet know whether the future (as of yet unencountered) references are bad or not.

The system 100 comprises client devices 110 (clients 110), server devices 120 (server 120), and a data store/database 130. Each client 110 comprises a processor 111 and a non-transitory compute-readable storage medium 112 comprising executable instructions representing an extract-transform-load (ETL) interface 114.

The server 120 comprises a processor 121 and a non-transitory computer-readable storage medium 122 comprising executable instructions representing a preprocessor 123 and an ETL manager 124.

The data store/DB 130 comprises a processor 131 and a non-transitory computer-readable storage medium 132 comprising data store/DB tables 134 and executable instructions representing an Application Programming Interface (API) 133.

As used herein, a "principal" refers to either a user (such as a developer or a data analyst) or an automated application or program. The principal initiates an upload with update data for extracting the corresponding data associated with the updated data from the database 130, transforming or changing the extracted data with the update data, and then loading the changed or updated data back into the database 130 (herein discussed as ETL).

When the principal is an automated program, an API is processed by the principal to interact with preprocessor 123 and/or ETL manager 124, the principal provides through the API a link or an identifier for the update data and identifies the target DB tables 134 for the ETL operations. The principal may also provide a script or instructions that process an import job where the import job includes information for identifying the update data and the target DB tables 134. For example, a search and retrieval may be included within the script or the instructions as part of the import job and the returned columns and rows or matching tables 134 identify the target DB tables 134

When the principal is a user, the user access ETL interface 114 from client 110 and identifies the set of update data that is to be updated and the target DB tables 134 for the ETL operations, and the principal provides a link or an identifier for the update data and identifies the target DB tables 134 for the ETL. Again, the identification of the target DB tables 134 and the update data may be defined or identified from a user-provided script or program as was discussed above.

The preprocessor 123 obtains the link or the identifier for the update data along with the identifiers for the DB tables 134 from the principal. The preprocessor 123 access the DB schemas associated with the target DB tables 134. The schemas include key definitions, field/column definitions for each of the target DB tables 134 as well as data type definitions for each table 134 and/or any data value formatting requirements. The schema definitions are then compared against the key definitions, fields/columns, data types, and data fields in the update data. Foreign keys in the update data are deduced from the schemas of the target tables based on patterns defined in the schemas.

The ETL request and the update data combined represents an "import job" that is to be processed to update the target DB tables 134 within DB 130.

Preprocessor 123 processes a key resolution algorithm and deduces foreign keys from the schemas to detect whether any referential integrity violations are guaranteed to happen in the import job, guaranteed not to happen in the import job, or whether a determination is not yet knowable because of unknown results associated with future DB transactions within the job. In an embodiment preprocessor 123 may split the original submitted ETL job into multiple sub jobs, one associated with processing the references that are guaranteed not to have any referential integrity problem, another job associated with the references guaranteed to have referential integrity issues, and a third job associated with references for which it is presently unknown as to whether there are any referential integrity issues.

Thus, three categories within the update data of the import job are identified: a first category associated with a first portion of the update data that is guaranteed to process properly during the ETL and is known not to have any referential integrity issues, a second category associated with a second portion of the update data that is guaranteed to not process properly and will cause the ETL to fail because of known referential integrity issues, and a third category associated with a third portion of the update data for which a determination cannot be made because other DB transactions that have not been processed are dependent on the determination.

Preprocessor 123 then modifies the import job ensuring that the updating the second and third portions are not updated when the first portion is updated (this may be through splitting the portions into multiple jobs as was discussed above). When the first portion does update with the corresponding update data, custom data analyst-defined error messages for each record associated with the second and third portions may be updated into custom fields of the data store. These custom defined error messages may be housed in an additional field/column added to the update data and/or the corresponding affected target DB tables 134. The preprocessor then provides the modified import job to the ETL manager 124 and the first category associated with the first portion of the update data is processed by the ETL manager 124 causing the first portion to update within the corresponding DB tables 134 of the DB 130 and causing the second and third portions to produce custom error or warning messages in special fields or columns of the target DB tables 134; as stated above, there may be second and third sub jobs that then attempt to update the corresponding update data to the tables 134, which causes a rollback in the case of the guaranteed and known referential integrity problems, and which may not necessarily cause any rollback in the case of the as yet-unknown portions that may or could have referential integrity issues.

As a result, a portion of the update data that is known to not include any referential integrity problems will be updated to the corresponding target DB tables 134. Thus, the import job will not cause a rollback and fail the entire import job. Moreover, system-provided or custom data analyst-defined error messages will be noted in those records/portions of the DB tables 134 indicating the issue associated with not updating those records/portions with the import job. The data analyst can then fix the referential integrity issues within the update data and run a second import job to complete the ETL update for the non-updated portions of the original update data.

The system 100 provides a substantial speed or processing and functional improvement over existing ETL update processes because the entire update data is not rolled back and only the portion of the update data that is known not to cause a DB 130 import error is processed. Furthermore, diagnostic information for the portions of the update data that was not processed for the import job is custom defined and retained for immediate inspection and resolution by the data analyst or the developer.

It is again noted that some existing ETL update processes may allow referential integrity violations to be updated to the database (which can cause errors in the data and/or cause production jobs to fail) and in these cases system 100 is superior because the DB 130 maintains referential integrity and will not cause production jobs to fail because the reference links are known to be valid.

It is noted that although the discussion was provided for the processing of system 100 in a serialized or ordered manner, this does not have to be the case. As preprocessor 123 may be executed in parallel with the ETL job as the ETL job is being processed by the data store 130. Additionally, the portion of the ETL job that is unresolved as to whether it is associated with update data that may or may not have any referential integrity issues may at first be of a first larger size during the processing and while the ETL job progresses and is being modified in real time by preprocessor 123 the size of the portion of the ETL job that is unresolved as to whether it is associated with update data that may or may not have any referential integrity issues substantially decreases from the first larger size because resolution is known. As a special case, the size of this portion can be in this fashion reduced to zero. That is achieved when the database tables and types of update operations to be made on them (creating a record, updating a record, deletion of a record) can be executed in an order guaranteed to be determined to be favorable for all types of references within the ETL job itself, i.e., so that the referent is always processed before the reference is.

These and other embodiments are now discussed with reference to FIGS. 2-3.

Figure 2:
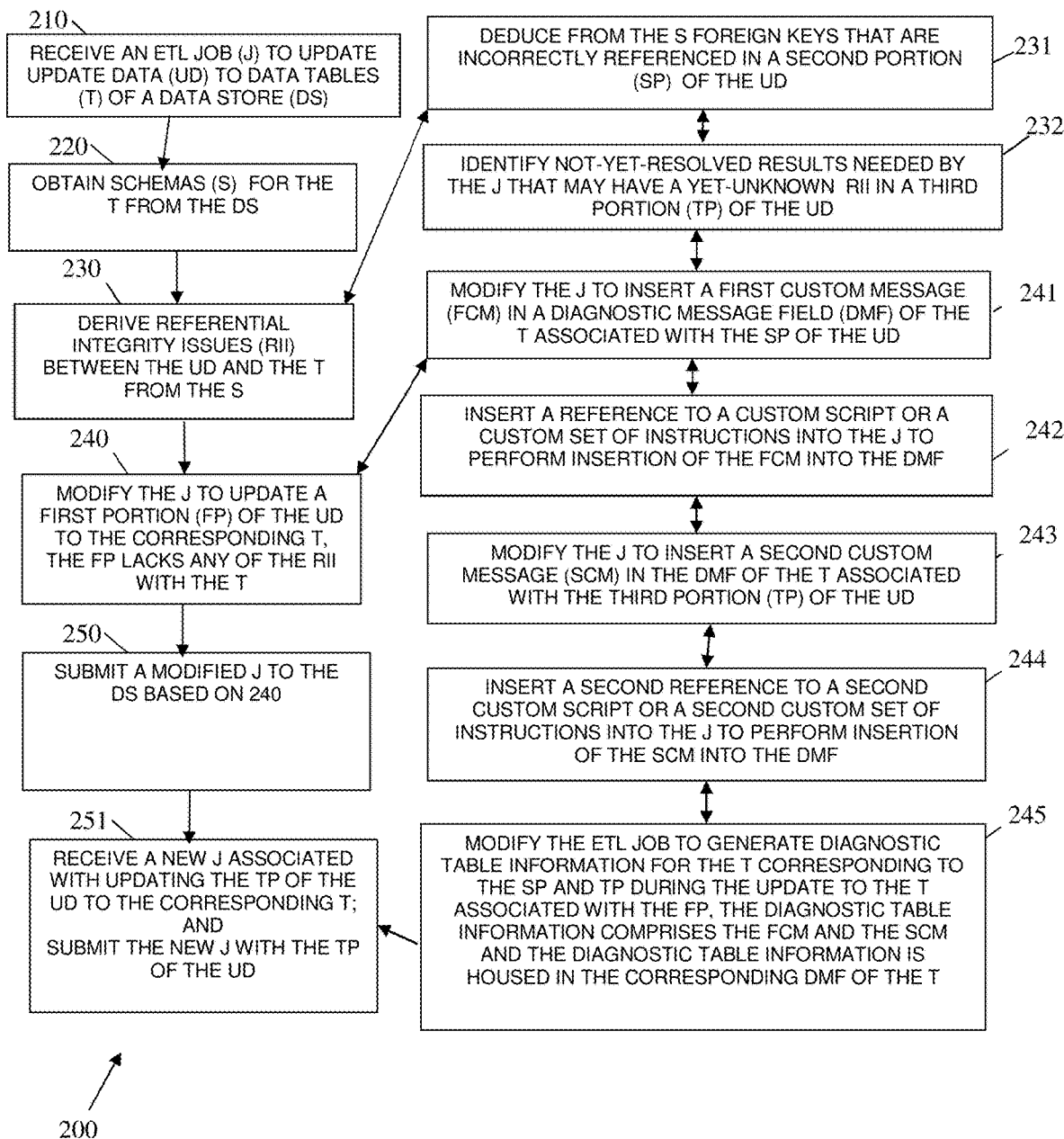
FIG. 2 is a diagram of a method for referential integrity update processing, according to an example embodiment.

FIG. 2 is a diagram of a method 200 for a referential integrity update processing, according to an example embodiment. The software module(s) that implements the method 200 is referred to as a "ETL update job manager." The ETL update job manager is implemented as executable instructions programmed and residing within memory and/or a non-transitory computer-readable (processor-readable) storage medium and executed by one or more processors of a cloud/server. The processor(s) of the cloud/server that executes the ETL update job manager are specifically configured and programmed to process the ETL update job manager. The ETL update job manager has access to one or more network connections during its processing. The network connections can be wired, wireless, or a combination of wired and wireless.

In an embodiment, the ETL update job manager executes on a server 120. In an embodiment, server 120 is a one of multiple servers that cooperate in cloud processing environment (cloud).

In an embodiment, the ETL update job manager is all or some combination of preprocessor 123 and/or ETL manager 124.

At 210, the ETL update job manager receives an ETL job to update data to data tables of a data store.

At 220, the ETL update job manager obtains schemas for the data tables from the data store.

At 230, the ETL update job manager derives referential integrity issues between the update data and the data tables from the schemas.

In an embodiment, at 231, the ETL update job manager deduces from the schemas foreign keys that are incorrectly referenced in a second portion of the update data.

In an embodiment of 231 and at 232, the ETL update job manager identifies not-yet-resolved results needed by the ETL job that may have a currently unknown referential integrity issue in a third portion of the update data.

At 240, the ETL update job manager modifies the ETL job to update a first portion of the update data to the corresponding data tables, wherein the first portion lacks any of the referential integrity issues with the data tables.

In an embodiment of 232 and 240, at 241, the ETL update job manager modifies the ETL job to insert a first custom message in a diagnostic message field of the data tables associated with the second portion of the update data.

In an embodiment of 241 and at 242, the ETL update job manager inserts a reference to a custom script or a custom set of instructions into the ETL job to performing insertion of the first custom message into the diagnostic message field.

In an embodiment of 242 and at 243, the ETL update job manager modifies the ETL job to insert a second custom message in the diagnostic message field of the data tables associated with the third portion of the update data.

In an embodiment of 243 and at 244, the ETL update job manager inserts a second reference to a second custom script or a second custom set of instructions into the ETL job to performing insertion of the second custom message into the diagnostic message field.

In an embodiment of 244 and at 245, the ETL update job manager causes the ETL job to generate diagnostic data table information following the update to the data tables associated with the first portion, wherein the diagnostic table information includes fields of the data tables that were not updated having the corresponding second portion or the corresponding third portion of the update data along with the corresponding diagnostic message field recorded in the corresponding data tables.

In an embodiment, the processing associated with 230-245 occurs in parallel, such that the order recited is not a requirement. Furthermore, the third portion of update data associated with currently unknown referential integrity issues can potentially be completely resolved such that there is no longer any third portion or the original size of the third portion can be substantially decreased during the parallel processing.

At 250, the ETL update job manager submits a modified ETL job to the data store based on the modifying.

In an embodiment of 245 and 250, at 251, the ETL update job manager receives a new ETL job associated with updating the third portions of the update data to the corresponding data tables. The ETL update job manager submits the new ETL job with the third portions of the update data.

Figure 3:
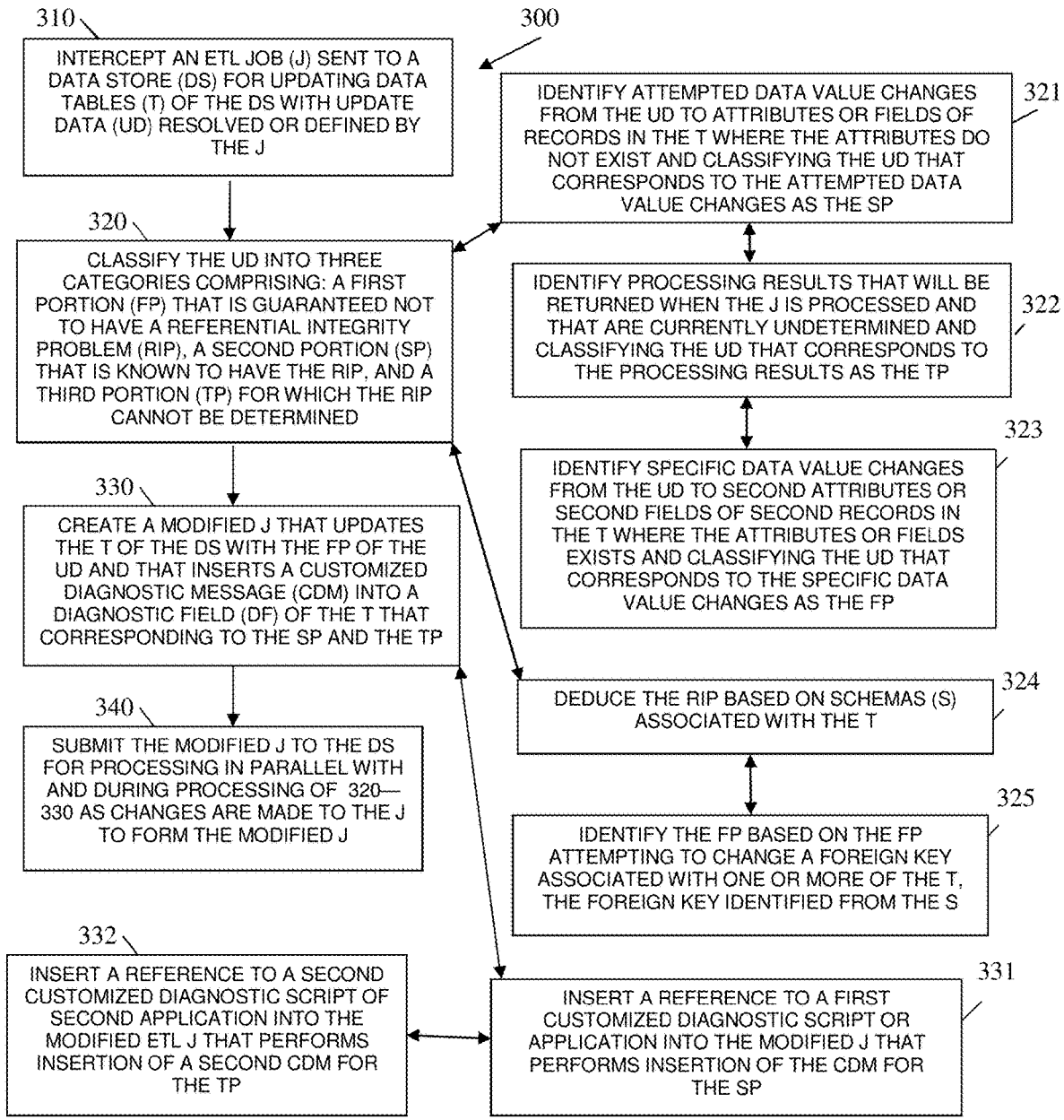
FIG. 3 is a diagram of another method for referential integrity update processing, according to an example embodiment.

FIG. 3 is a diagram of another method 300 for referential integrity update processing, according to an example embodiment. The software module(s) that implements the method 300 is referred to as a "referential integrity manager." The referential integrity manager is implemented as executable instructions/firmware programmed and residing within memory and/or a non-transitory computer-readable (processor-readable) storage medium and executed by one or more processors of cloud/server. The processors that execute the referential integrity manager are specifically configured and programmed to process the referential integrity manager. The referential integrity manager has access to one or more network connections during its processing. The network connections can be wired, wireless, or a combination of wired and wireless.

In an embodiment, the referential integrity manager executes on server 120. In an embodiment, server 120 is one of multiple servers that logically cooperate as a single server from a cloud processing environment (cloud).

In an embodiment, the referential integrity manager is all of or some combination of preprocessor 123, ETL manager 124, and/or the method 200.

The referential integrity manager presents another and, in some ways, enhanced processing perspective of that which was discussed above with the method 200 of FIG. 2.

At 310, the referential integrity manager intercepts an ETL job sent to a data store for updating data tables of the data store with update data resolved or defined by the ETL job.

At 320, the referential integrity manager classifies the update data into three categories comprising: a first portion that is guaranteed not to have a referential integrity problem, a second portion that is known to have the referential integrity problem, and a third portion for which the referential integrity problem cannot be determined.

In an embodiment, at 321, the referential integrity manager identifies attempted data value changes from the update data to attributes or fields of records in the data tables where the attributes do not exist and classifying the update data that corresponds to the attempted data value changes as the second portion.

In an embodiment of 321 and at 322, the referential integrity manager identifies processing results that will be returned when the ETL job is processed and that are currently undetermined and classifying the update data that corresponds to the processing results as the third portion.

In an embodiment of 322 and at 323, the referential integrity manager identifies specific data value changes from the update data to second attributes or second fields of second records in the data tables where the attributes or fields exists and classifying the update data that corresponds to the specific data value changes as the first portion.

In an embodiment of 320 and at 324, the referential integrity manager deduces the referential integrity problem based on schemas associated with the data tables.

In an embodiment of 324 and at 325, the referential integrity manager identifies the first portion based on the first portion attempting to change a foreign key associated with one or more of the data tables, wherein the foreign key identified from the schemas.

At 330, the referential integrity manager creates a modified ETL job that updates the data tables of the data store with the first portion of the update data and that inserts a customized diagnostic message into a diagnostic field of the data tables that corresponding to the second portion and the third portion.

In an embodiment, at 331, the referential integrity manager inserts a reference to a first customized diagnostic script or application into the modified ETL job that performs insertion of the customized diagnostic message for the second portion.

In an embodiment of 331 and at 332, the referential integrity manager inserts a reference to a second customized diagnostic script of second application into the modified ETL that performs insertion of a second customized diagnostic message for the third portion.

At 340, the referential integrity manager submits the modified ETL to the data store in parallel with and during the processing of 320-332 for processing as changes to the ETL job are made to form the modified ETL job.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving an Extract-Transform-Load (ETL) job to update data to data tables of a data store, wherein the ETL job comprises a link to update data and identifiers for the data tables;
   obtaining schemas for the data tables from the data store;
   deriving referential integrity issues between the update data and the data tables from patterns defined in the schemas by processing a key resolution algorithm, deducing foreign keys from the schemas based on the patterns, splitting the ETL job into multiple sub jobs, one associated with processing first references that are guaranteed not to have any referential integrity problem, another job associated with second references guaranteed to have referential integrity issues, and third job associated with third references for which it is presently unknown as to whether there are any referential integrity issues;
   modifying the ETL job to update a first portion of the update data to corresponding data tables, wherein the first portion lacks any of the referential integrity issues with the data tables and dynamically modifying the modified ETL job as the modified ETL job processes to identify and add certain portions of referential integrity violations originally determined to be unknowable when the certain portions are resolved and known as the modified ETL job dynamically processes, wherein a size of a given portion of the ETL job that is unresolved as to whether the ETL job is associated with the update data that may or may not have any of the referential integrity issues, substantially decreases from a first larger size because resolution is known; and
   submitting a modified ETL job to the data store.

2. The method of claim 1, wherein deriving further includes detecting referential integrity violations that are guaranteed to happen when the ETL job is processed.

3. The method of claim 1, wherein deriving further includes identifying referential integrity violations that are guaranteed not to happen when the ETL job is processed.

4. The method of claim 1, wherein deriving further includes determining referential integrity violations that are unknowable when the ETL job is processed.

5. The method of claim 1, wherein modifying includes splitting the ETL job into multiple sub jobs.

6. The method of claim 5, wherein a first sub job is associated with processing first references guaranteed not to have any referential integrity problem.

7. The method of claim 5, wherein a second sub job is associated with second references guaranteed to have referential integrity issues.

8. The method of claim 5, wherein a third sub job is associated with third references for which it is presently unknown whether there are any referential integrity issues.

9. The method of claim 1, wherein a size of a given portion of the ETL job which is unresolved as to whether the given portion is associated with data updated that may or may not have any of the referential integrity issues substantially decreases from a first larger size because resolution is known.

10. The method of claim 1, wherein referents are processed before corresponding references are processed.

11. A method, comprising:
intercepting an Extract-Transform-Load (ETL) job sent to a data store for updating data tables of the data store with update data resolved or defined by the ETL job, wherein the ETL job comprises a link to the update data and identifiers for the data tables;
classifying, by processing a key resolution algorithm, the update data into three categories comprising: a first portion that is guaranteed not to have a referential integrity problem, a second portion that is known to have the referential integrity problem, and a third portion for which the referential integrity problem cannot be determined;
creating a modified ETL job that updates the data tables of the data store with the first portion of the update data and that inserts a customized diagnostic message into a diagnostic field of the data tables that correspond to the second portion and the third portion; and
submitting the modified ETL job to the data store to enable processing in parallel with and during the processing of the classifying and the creating to form the modified ETL job and dynamically modifying the modified ETL job as the modified ETL job processes to split the third portion into multiple sub jobs, one associated with processing first references that are guaranteed not to have any referential integrity problem, another job associated with second references guaranteed to have referential integrity issues, and a third job associated with third references for which the third job is presently unknown as to whether there are any of the referential integrity issues wherein referents are always processed before corresponding references are.

12. The method of claim 11, wherein classifying includes deducing foreign keys from patterns defined in schemas of the data tables.

13. The method of claim 11, wherein classifying includes detecting referential integrity violations based on patterns.

14. The method of claim 11, wherein creating includes inserting a reference to a first customized diagnostic script or application into the modified ETL job that performs insertion of a customized diagnostic message.

15. The method of claim 11, wherein creating includes inserting a reference to a second customized diagnostic script or second application into the modified ETL job that performs insertion of a second customized diagnostic message.

16. The method of claim 11 further comprising dynamically modifying the modified ETL job during processing to split the third portion into multiple sub jobs as resolution becomes known.

17. A system, comprising:
a client comprising a client processor and a client non-transitory computer-readable storage medium comprising executable instructions representing an Extract-Transform-Load (ETL) interface;
a server comprising a server processor and a server non-transitory computer-readable storage medium comprising executable instructions representing an ETL preprocessor;
a database comprising database tables;
the ETL interface when executed by the client processor from the client non-transitory computer-readable storage medium causes the client processor to perform processing comprising:
submitting an ETL job to the ETL preprocessor, the ETL job to update the database tables with update data defined within the ETL job, wherein the ETL job comprises a link to the update data and identifies for the database tables;
the ETL preprocessor and an application programming interface (API) when executed by the server processor from the server non-transitory computer-readable storage medium causes the server processor to perform processing comprising:
inspecting the update data for referential integrity problems with the database tables based on patterns defined in schemas associated with the database tables by processing a ley resolution algorithm, deducing foreign keys from the schemas based on the patterns, and detecting the referential integrity problems that are guaranteed to happen when the ETL job is processed, guaranteed not to happen when the ETL job is processed, and determined to be unknowable when the ETL job is processed;
creating a modified ETL job by modifying the ETL job to update a first portion of the update data to the database tables, wherein the first portion is identified as guaranteed to not have any of the referential integrity problems when the ETL job is processed and dynamically modifying the modified ETL job as the modified ETL job processes to split the referential integrity problems originally determined to be unknowable when the ETL job is processed into multiple sub jobs, one associated with processing first references that are guaranteed to not have any referential integrity problem, another job associated with second references guaranteed to have referential integrity issues, and a third job associated with third references for which the third job is presently unknown as to whether there are any of the referential integrity issues, wherein referents are always processed before corresponding references are; and
processing the API to submit the modified ETL to the database for updating corresponding database tables with valued defined in the first portion of the update data.

18. The system of claim 17, wherein the ETL preprocessor when executed by the server processor further causes the server processor to:

process classification for a first portion, a second portion, and a third portion in parallel with execution of a gradually identified first portion for the modified ETL job; and add second instructions to the modified ETL job that adds a second customized message to a second diagnostic field in the database tables that correspond to a reduced in size third port.

\* \* \* \* \*